S. J. RANDALL & J. O'BRIEN.
Insertible Saw-Teeth.
No. 200,219. Patented Feb. 12, 1878.
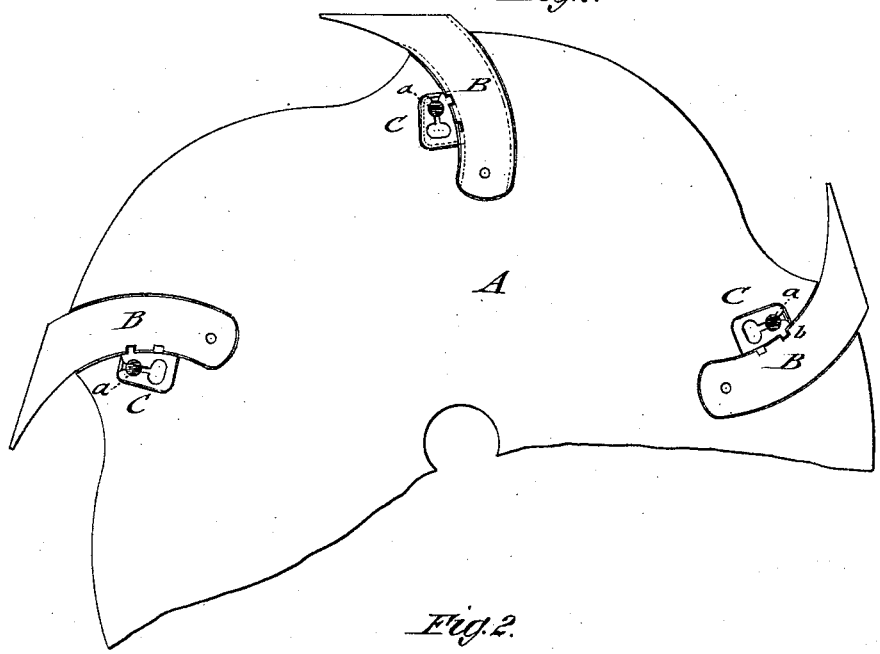
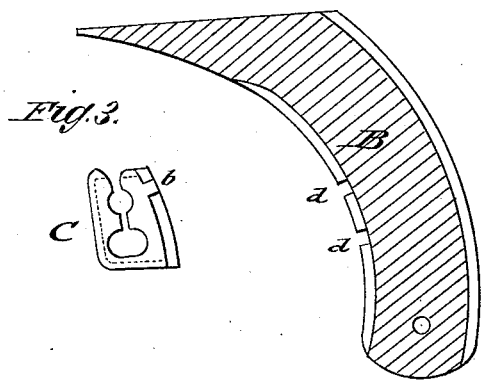
WITNESSES:
Francis McArdle
C. Sedgwick
INVENTOR:
S. J. Randall
J. O'Brien
BY
ATTORNEYS.

UNITED STATES PATENT OFFICE.

SQUIRE J. RANDALL AND JAMES O'BRIEN, OF PORT LUDLOW, WASHINGTON TERRITORY.

IMPROVEMENT IN INSERTIBLE SAW-TEETH.

Specification forming part of Letters Patent No. 200,219, dated February 12, 1878; application filed December 11, 1877.

*To all whom it may concern:*

Be it known that we, SQUIRE J. RANDALL and JAMES O'BRIEN, of Port Ludlow, in the county of Jefferson, Washington Territory, have invented a new and Improved Saw Tooth and Holder, of which the following is a specification:

In the accompanying drawing, Figure 1 represents a side view of a saw with our improved adjustable teeth and holder; and Figs. 2 and 3 are, respectively, a central section of a tooth and a side view of a tooth-holder, on enlarged scale, and detached from the saw.

Similar letters of reference indicate corresponding parts.

This invention relates to an improved adjustable saw-tooth that may be moved when worn, so as to project at the same angle beyond the edge of the saw-blade; and the invention consists of an arc-shaped tooth, sliding by its grooved edge in a tongued recess of the saw, and being retained by a split spring-holder that is grooved on three sides, seated in a recess of the saw, and provided with a projection that enters into recesses of one of the grooved edges of the tooth, so as to lock the same in connection with a pin or rivet of the holder.

In the drawing, A represents a circular or other saw, and B the adjustable teeth of the same, that are made of arc shape, and guided in corresponding recesses of the saw. The arc-shaped edges of end tooth B are grooved and guided along the correspondingly-tongued edges of the saw-recess.

A tooth-holder, C, that is grooved at three sides, is fitted into a recess of the saw adjoining the tooth, and by a tongue at the fourth side into the grooved edge of the tooth. The holder C is split longitudinally, so as to impart some spring action to the side edges, and made with two holes—one for securing the spring action, the other for inserting a pin or rivet, *a*, by which the holder is spread.

A projection, *b*, of the holder C enters one of a suitable number of recesses, *d*, arranged in the grooved edge of the tooth, adjoining the holders, being retained therein by the action of the spring-holder, so as to rigidly lock the tooth into position.

When the tooth is worn out by use, the holder is detached by removing the pin or rivet, and then the tooth moved outwardly until the projection *b* engages the next recess of the tooth, and so on. The teeth are thus readily raised until used up, when new teeth may be inserted, they being rigidly locked by the riveted tooth-holder.

Having thus described our invention, we claim as new and desire to secure by Letters Patent—

1. As an improvement in saws with adjustable saw-teeth, the combination of the saw, having arc-shaped recess for tooth and side recess for tooth-holder, the edges of both recesses being tongued, with an arc-shaped tooth and a split spring-holder, both grooved to fit the corresponding recesses of the saw, the tooth-holder locking, furthermore, by a projection into recesses or notches of the tooth, substantially as and for the purpose described.

2. The combination of a saw having recesses for adjustable tooth and a detachable tooth-holder with an arc-shaped saw-tooth, made movable in the recess, and with a spring-holder and spreading rivet or pin, that locks a projection of the holder into one of the side recesses or notches of the tooth, substantially as and for the purpose set forth.

SQUIRE J. RANDALL.
JAMES O'BRIEN.

Witnesses:
A. D. ATTRIDGE,
THOMAS J. JOHNS.